United States Patent [19]
Bloom

[11] Patent Number: 5,815,619
[45] Date of Patent: Sep. 29, 1998

[54] FIBER OPTIC CONNECTOR HERMETICALLY TERMINATED

[76] Inventor: Cary Bloom, 251 Blaze Climber Way, Rockville, Md. 20850

[21] Appl. No.: 763,125

[22] Filed: Dec. 10, 1996

[51] Int. Cl.$^6$ ....................................................... G02B 6/36
[52] U.S. Cl. ................................ 385/78; 385/76; 385/60; 385/72
[58] Field of Search ................................. 385/78, 76, 60, 385/72, 80, 138, 139

[56] References Cited

U.S. PATENT DOCUMENTS

| Re. 33,296 | 8/1990 | Stowe et al. . |
| Re. 34,955 | 5/1995 | Anton et al. ................................ 385/53 |

(List continued on next page.)

FOREIGN PATENT DOCUMENTS

| 58216216 | 12/1983 | European Pat. Off. . |
| 0 104 513 | 4/1984 | European Pat. Off. . |
| 0293289 | 5/1988 | European Pat. Off. . |
| 0 285 784 | 10/1988 | European Pat. Off. . |
| 0 628 840 | 12/1994 | European Pat. Off. . |
| 2235043 | 8/1990 | United Kingdom . |
| WO87/00934 | 7/1986 | WIPO . |
| 0215668A2 | 9/1986 | WIPO . |
| WO 86/05596 | 9/1986 | WIPO . |
| WO 93/13442 | 7/1993 | WIPO . |
| WO 96/37794 | 11/1996 | WIPO . |

OTHER PUBLICATIONS

"Automated Fabrication of Fused Fibre Optic Couplers", Swain, R., M. Phil. dissertation, Heroit–Watt University, Edinburgh, Ireland (1993), No month.
"Tapered Optical Fiber Components and Sensors", by L.C. Bobb, et al., Microwave journal, May 1992.
"The Shape of Fiber Tapers", by T.A. Birks et al., Journal of Lightwave Technology, IEEE, vol. 10, No. 4, Apr. 1992, pp. 432–438.
"Mass Production of Fused Couplers and Coupler Based Devices", by W.E. Moore et al, No month, No year.
"Loss and Spectral Control in Fused Tapered Couplers", by K.P. Oakley et al., Optical Engineering, vol. 33, No. 12, Dec. 1994, pp. 4006–4019.
"Control of Optical Fibre Taper Shape", Electronics Letters, vol. 27, No. 18, Aug. 29, 1991.
"Fiber–Coupler Fabrication with Automatic Fusion–Elongation Processes for Low Excess Loss and High Coupling-Ratio Accuracy", by I. Yokohama, et al., Journal of Lightwave Technology, IEEE, vol. LT–5, No. 7, Jul. 1987. IC Assembly Technology, pp. 3–26–3–32, No month, No year.
Fibre–optic Coupler Fabrication at AOFR, by A.J. Stevenson et al., International Journal of Optoelectronics, vol. 6, Nos. 1/2, 1991, pp. 127–144.
"From your space . . . to outer space", Fibre Bragg Gratings, 3M Innovation, Circle No. 76. 1996 No Month.
"100ips & 2 microns", Anorad linear motor gantries, Anorad Corporation, Circle 7. No Month, No year.
"1$\mu$m, 2g, 3m/s", Anorad LW linear motor stages, Anorad Corporation, Circle 7. No month and year.

(List continued on next page.)

*Primary Examiner*—Phan T. H. Palmer
*Attorney, Agent, or Firm*—Pepper Hamilton LLP

[57] ABSTRACT

An arrangement for sealing an optical fiber within a fiber optic connector. The fiber optic connector includes a ferrule having an outside diameter and a throughbore. An exposed portion of the optical fiber is positioned within the throughbore of the ferrule, and a metal seal is added between the ferrule and the outer diameter of the optical fiber, forming a bond between the ferrule and the optical fiber. The disclosed method includes the steps of heating the ferrule wherein the ferrule has a throughbore. The optical fiber is then placed within the throughbore. A molten metal is added between the ferrule and the exposed region of the optical fiber. A bond is formed between the ferrule and the optical fiber during cooling of the molten metal.

48 Claims, 4 Drawing Sheets

U.S. PATENT DOCUMENTS

| | | | |
|---|---|---|---|
| 3,854,003 | 12/1974 | Duret | 174/88 |
| 4,611,894 | 9/1986 | Roberts | 350/96.15 |
| 4,699,453 | 10/1987 | Roberts | 350/96.2 |
| 4,701,010 | 10/1987 | Roberts | 350/96.15 |
| 4,707,065 | 11/1987 | Jenkins | 385/80 X |
| 4,714,316 | 12/1987 | Moore et al. | 350/96.2 |
| 4,763,977 | 8/1988 | Kawasaki et al. | 350/96.15 |
| 4,772,085 | 9/1988 | Moore et al. | 350/96.15 |
| 4,779,945 | 10/1988 | Hill et al. | 350/96.15 |
| 4,792,203 | 12/1988 | Nelson et al. | 350/96.2 |
| 4,798,438 | 1/1989 | Moore et al. | 350/96.15 |
| 4,834,481 | 5/1989 | Lawson et al. | 350/96.15 |
| 4,895,423 | 1/1990 | Bilodeau et al. | 350/96.15 |
| 4,900,119 | 2/1990 | Hill et al. | 350/96.15 |
| 4,906,068 | 3/1990 | Olson et al. | 350/96.3 |
| 4,923,273 | 5/1990 | Taylor | 350/96.21 |
| 4,957,338 | 9/1990 | Thorncraft et al. . | |
| 4,995,688 | 2/1991 | Anton et al. . | |
| 4,997,243 | 3/1991 | Aiki et al. . | |
| 4,997,245 | 3/1991 | DuPuy et al. . | |
| 4,997,247 | 3/1991 | Stowe . | |
| 4,997,248 | 3/1991 | Stowe . | |
| 4,997,252 | 3/1991 | Sugawara et al. . | |
| 4,997,253 | 3/1991 | Enochs . | |
| 5,013,117 | 5/1991 | Fukuma . | |
| 5,013,121 | 5/1991 | Anton et al. . | |
| 5,028,110 | 7/1991 | Plummer . | |
| 5,031,994 | 7/1991 | Emmons . | |
| 5,037,176 | 8/1991 | Roberts et al. . | |
| 5,066,149 | 11/1991 | Wheeler et al. . | |
| 5,067,678 | 11/1991 | Henneberger et al. . | |
| 5,093,885 | 3/1992 | Anton . | |
| 5,121,453 | 6/1992 | Orazi et al. . | |
| 5,123,219 | 6/1992 | Beard et al. . | |
| 5,136,121 | 8/1992 | Kluska et al. . | |
| 5,157,751 | 10/1992 | Maas et al. . | |
| 5,159,655 | 10/1992 | Ziebol . | |
| 5,166,992 | 11/1992 | Cassidy et al. . | |
| 5,166,994 | 11/1992 | Stowe et al. . | |
| 5,179,608 | 1/1993 | Ziebol et al. . | |
| 5,179,618 | 1/1993 | Anton . | |
| 5,189,723 | 2/1993 | Johnson et al. . | |
| 5,208,894 | 5/1993 | Johnson et al. . | |
| 5,214,732 | 5/1993 | Beard et al. . | |
| 5,214,735 | 5/1993 | Henneberger et al. . | |
| 5,216,736 | 6/1993 | Essert | 385/96 |
| 5,222,176 | 6/1993 | Webber et al. . | |
| 5,239,604 | 8/1993 | Ziebol et al. . | |
| 5,251,002 | 10/1993 | Gryk | 356/73.1 |
| 5,261,019 | 11/1993 | Beard et al. . | |
| 5,274,731 | 12/1993 | White . | |
| 5,283,852 | 2/1994 | Gibler et al. . | |
| 5,293,440 | 3/1994 | Miles et al. . | |
| 5,293,582 | 3/1994 | Beard et al. . | |
| 5,305,405 | 4/1994 | Emmons et al. . | |
| 5,316,243 | 5/1994 | Henneberger . | |
| 5,317,663 | 5/1994 | Beard et al. . | |
| 5,319,728 | 6/1994 | Lu et al. . | |
| 5,319,733 | 6/1994 | Emmons et al. . | |
| 5,329,600 | 7/1994 | Sasaoka et al. | 385/43 |
| 5,343,544 | 8/1994 | Boyd et al. . | |
| 5,355,426 | 10/1994 | Daniel et al. . | |
| 5,363,465 | 11/1994 | Korkowski et al. . | |
| 5,367,591 | 11/1994 | Seike et al. . | |
| 5,381,497 | 1/1995 | Toland et al. . | |
| 5,386,484 | 1/1995 | Ooka et al. . | |
| 5,386,488 | 1/1995 | Oikawa . | |
| 5,386,490 | 1/1995 | Pan et al. . | |
| 5,395,101 | 3/1995 | Takimoto et al. . | |
| 5,422,969 | 6/1995 | Eno | 385/54 |
| 5,432,875 | 7/1995 | Korkowski et al. | 385/27 |
| 5,445,319 | 8/1995 | Pan et al. | 239/1 |
| 5,459,598 | 10/1995 | Carrington | 359/81 |
| 5,463,704 | 10/1995 | Ziebol | 385/22 |
| 5,475,780 | 12/1995 | Mizrahi | 385/37 |
| 5,475,782 | 12/1995 | Ziebol | 385/87 |
| 5,475,784 | 12/1995 | Bookbinder et al. | 385/94 |
| 5,497,444 | 3/1996 | Wheeler | 385/135 |
| 5,577,149 | 11/1996 | Averbeck et al. | 385/134 |
| 5,588,087 | 12/1996 | Emmons et al. | 385/140 |
| 5,602,952 | 2/1997 | Rashleigh et al. | 385/100 |

OTHER PUBLICATIONS

"The New Standard for Case Erecting and Sealing", ABC Packaging Machine Corporation, Circle 22, No Month, No Year.

"All Product Brochure" Schleuniger, Inc., pp. 1–12. No month, No year.

"Schleuniger US 2545 Stripping Machine", Schleuniger, Inc.. No month, No year.

"Schleuniger FO 7010 Kelvar Cutting Machine", Schleuniger, Inc.. No month, No year.

"Schleuniger PF 1000/PF 2000 Electric Demand Prefeeders", Schleuniger, Inc.. No month, No year.

"CP 1200 Coiling Unit", Schleuniger, Inc.. No month, No year.

"Schleuniger WS 1500/CP 1250 Wire Stacker/Coiling Pan", Schleuniger, Inc.. No month, No year.

"Premise Wiring Communication Fiber Optics", Fiber Instrument Sales Inc., 15th Edition, 1997, pp. 1–68. No month.

FIBER OPTIC CONNECTOR HERMETICALLY TERMINATED

TECHNICAL FIELD

The present invention relates to fiber optic connectors, specifically an arrangement for sealing an optical fiber within a fiber optic connector.

BACKGROUND ART

A typical prior art connector including a ferrule assembly is illustrated in FIG. 1. As is well known, standard fiber connectors lack the male-female polarity common in electronic connectors. Instead, fiber connectors 150 mate in an adaptor 152 that fit between two fiber connectors. A cable 154 has an exposed region 156 where the cladding is exposed. The region 156 is mounted in a long, thin cylinder called a ferrule 158 with a hole to match the fiber cladding diameter. The ferrule 158 centers and aligns the exposed region 156 and protects it from mechanical damage. Surrounding a portion of exposed region 156 is a connector body 160 which is attached to the ferrule 158. A strain-relief boot 162 is attached to the cable 154 and the connector body 160 and shields the junction of the connector body 160 and the cable 154.

The ferrules 158 are typically made of metal or ceramic, but some are made of plastics. The hole through the ferrule 158 must be large enough to fit the clad fiber and tight enough to hold it in a fixed position. An end 164 of the ferrule 158 and the exposed region 156 protrudes beyond the connector body 160.

The connector 150 slips into the left side of the adaptor 152. A second connector (not shown) slips into the right side of the connector 150. One connector is an emitter and the other a receptor. There are numerous problems with the prior art connectors. End losses between connectors occur due to many different factors including misalignment between emitters and receptors, the core being elliptical and the cladding thickness being inconsistent in the radial direction.

The above described fiber optic connector may be fastened to the ferrule by an adhesive, for example a light-curable acrylic. If exposed to the environment, the adhesive can absorb moisture from the atmosphere and change dimensions and rigidity, lowering the precision alignment of the optical fiber connector and increasing signal loss.

An epoxy may be used as the adhesive. The use of such epoxy, however, is still susceptible to moisture and chemicals. Hence, the epoxy may still break down upon exposure to moisture. Moreover, epoxy does not form a good bond with the optical fiber, and has relatively poor thermal characteristics, resulting in expansion or contraction due to changes in temperature.

Another proposed technique uses hermetically-sealed optical fibers having a metal coating instead of the conventional plastic coating. The proposed method removes the metal coating layer from the metal-coated optical fibers, fuses together the exposed portions of the optical fibers, and immediately after fusing, forms a metal reinforcing layer on the coupled portion of the optical fibers under an anhydrous atmosphere. The metal reinforcing layer is formed by applying a primary layer of metal on the exposed portion of the fibers by sputtering or vacuum vapor deposition in a reaction container having an inert gas. A secondary layer of metal is then applied over the primary layer for mechanical strength. Such a technique, however, is cumbersome because it requires sputtering or vapor deposition equipment. Alternative techniques include encapsulating optical fibers and the corresponding fiber coating in molten metal having a low melting point. The low melting point is necessary to prevent damage to organic material within the optical fiber assembly, for example glass or adhesive. Moreover, such techniques are difficult to control, especially since components less dense than the molten material may tend to float to the top of a mold and move off-center within the mold.

DISCLOSURE OF THE INVENTION

There is a need for an arrangement (apparatus and method) for hermetically terminating a fiber optic device without the necessity of adhesives that are subject to degradation upon exposure to air or moisture.

There is also a need for attaching a fiber to a ferrule in a reliable and controllable manner.

There is also a need for an arrangement for hermetically terminating a fiber optic device using metal bonded directly to the optical fiber to hermetically seal the fiber optic device.

There is also a need for an arrangement for forming a compressive and/or chemical seal in an efficient manner to hermetically seal a fiber optic device.

There is also a need to terminate an optical fiber that reliably provides a hermetic seal for the terminated optical fiber.

These and other needs are attained by the present invention where an optical fiber is hermetically sealed within a fiber optic connector.

These and other needs are also achieved by the present invention, where a metal seal forms a compressive and/or chemical bond with an optical fiber and also forms a bond with a ferrule.

According to one aspect of the present invention, a fiber optic connector includes a ferrule having an outside diameter and a throughbore. An exposed portion of the optical fiber is positioned within the throughbore and a metal seal is added between the ferrule and the outer diameter of the optical fiber, forming a bond between the ferrule and the optical fiber. The metal seal provides an hermetic seal between the optical fiber and the ferrule and aligns the optical fiber within the ferrule without distorting the optical fiber.

Another aspect of the present invention provides a method of forming a fiber optic connector. A ferrule having a throughbore is heated. An exposed region of an optical fiber is placed within the throughbore. A molten metal is added between the ferrule and the exposed region. A bond is formed between the optical fiber and the ferrule during the cooling of the molten metal.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention provides an arrangement (apparatus and method) for hermetically sealing an optical fiber within a fiber optic connector. As described below, a metal seal hermetically seals the optical fiber to the fiber optic connector. The metal seal bonds to the optical fiber chemically and/or compressively to ensure a hermetic seal. Hence, a hermetic seal may be easily implemented, without the necessity of adhesives.

Figure 2:
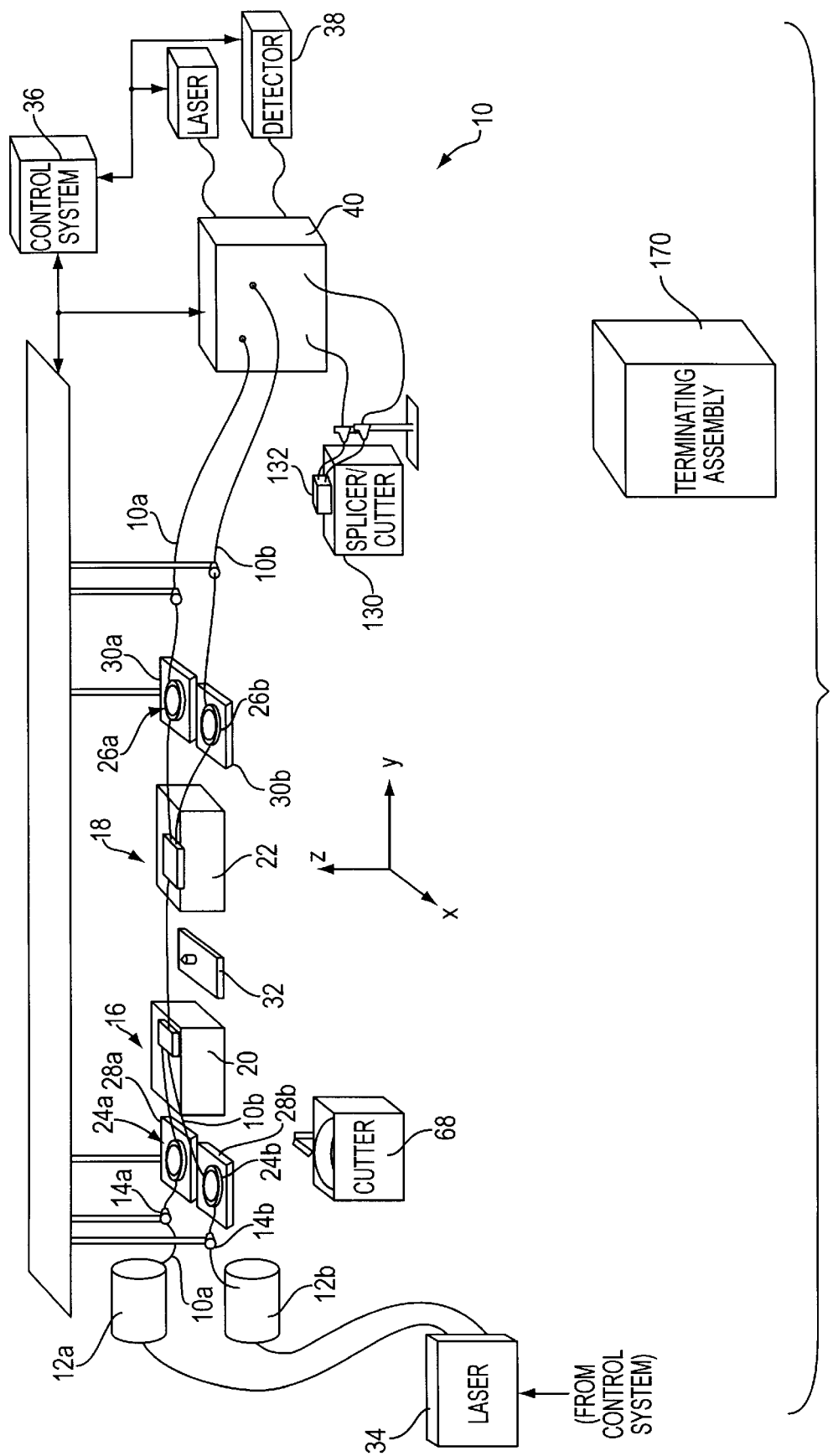
FIG. 2 is a diagram illustrating an overall system for automated fabrication of a fiber optic device according to an embodiment of the present invention.

FIG. 2 is a diagram illustrating an overall system for automated fabrication of a fiber optic device according to an embodiment of the present invention. The system 10 enables the automated fabrication of fiber optic devices, for example, fiber optic connectors, etc., without operator intervention. The method of the automatic fabrication of a fiber optic device may be summarized as follows.

During fabrication of a fiber optic device, lengths of optical fiber are removed from a device carrying a length of optical fiber, for example an optical fiber spool 12. The optical fiber is removed from the spool 12 in a manner that prevents twisting of the optical fiber in order to prevent any stresses from being induced on polarization-sensitive fibers, for example birefringent fibers. When the optical fiber spool 12 is initially set up for providing optical fiber, the end of the optical fiber on the spool 12 is secured into a stationary gripping device 14. As described below, the gripping device has at least an open and closed position, where the optical fiber may move freely when the gripping device 14 is in an open position, and where the fiber is securely positioned when the gripping device 14 is in a closed position.

Once the optical fiber from the spool 12 is secured into the stationary gripping device, the system 10 is able to maintain control over the end of the optical fiber and the path of the optical fiber. Specifically, the end of the optical fiber is controlled at all times to be at a specified position in order to maintain an accurate relationship between the optical fiber used during fabrication and the associated devices operating on the optical fiber. For example, control of the end of the optical fiber enables the system to automatically clamp the end of the optical fiber and perform automated fusion splicing, automated termination of the optical fiber to a ferrule, automated packaging for shipping in a container that secures the end for future use, etc. In addition, the length optical fiber is controlled as it is moved along a prescribed path, enabling the optical fiber to be positioned for clamping and collected for formation of fiber optic leads on each end of a fiber optic device. Hence, the disclosed embodiment provides a completely automated system for the fabrication of fiber optic devices by maintaining at all times precise control over the length of the optical fiber from the spool 12a and the corresponding fiber end.

Once the end of the optical fiber is secured to the stationary gripping device 14a, the optical fiber can be moved along a prescribed path in order to thread additional devices onto the optical fiber, or to position the optical fiber with respect to clamping devices. Once the optical fiber is moved through any devices to be threaded, the optical fiber is moved along the path of clamp assemblies 16 and 18 mounted on movable stages 20 and 22, respectively. The optical fiber is moved in a manner to provide an optical fiber lead 24 and 26 on each end of the clamp assemblies 16 and 18. The optical fiber leads 24 and 26 are placed in a lead container 28 and 30, respectively, for example trays.

Figure 1:
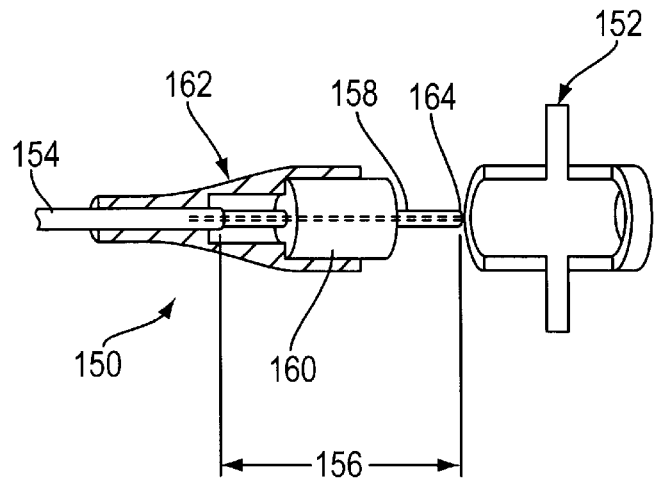
FIG. 1 is a diagram of a prior art connector including a ferrule.

Once the first optical fiber 10a is clamped for fabrication, a fiber optic device may be formed using the optical fiber 10a, for example by heating the optical fiber using a movable heat source 32 and pulling the heated optical fiber using the movable stages 20 and 22. Additional details regarding the automated fabrication of a fiber optic device according to FIG. 2 are disclosed in co-pending application 08/763,122, filed of even date herewith entitled "Arrangement for Automated Fabrication of Fiber Optic Devices," the disclosure of which is incorporated in its entirety herein by reference. FIG. 2 corresponds to FIG. 1 of that application.

After formation of the fiber optic device, the optical fibers 10a, 10b may be terminated using a movable terminating assembly 17, described below.

Figure 3A:
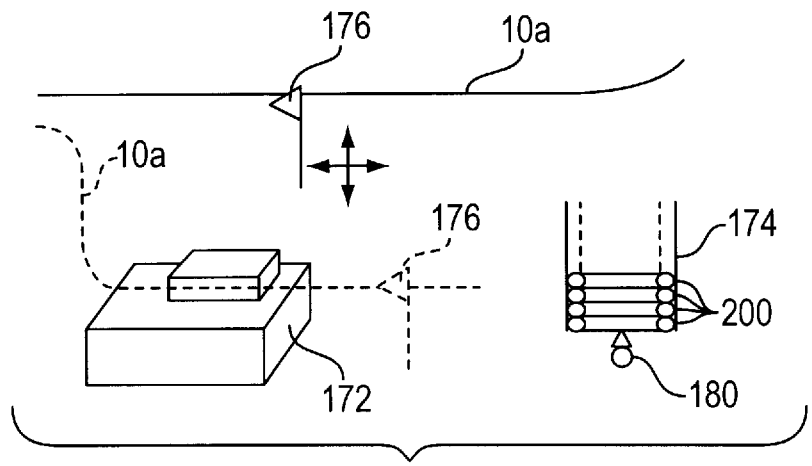
FIGS. 3A and 3B summarize a method of terminating and moving the optical fiber into position during fabrication of the fiber optic connector according to the present invention.
Figure 3B:
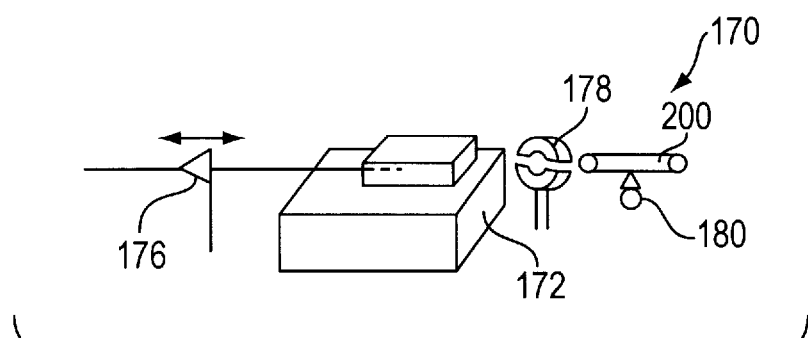

FIGS. 3a and 3b are diagrams illustrating the details of the terminating assembly 170 according to the present invention. The terminating assembly includes a splicer/cutter 172, a ferrule feeder 174, a clamp 176 and an alignment collar 178. After an optical fiber 10a, 10b has been positioned as shown in FIG. 2, the optical fiber can be terminated and a ferrule 200 attached thereto so that the terminated optical fiber can be connected through a coupler to another terminated optical fiber.

As shown in FIG. 3A, clamp 176 is movable in three axes and is moved to clamp onto the optical fiber 10a. The clamp 176 then moves optical fiber 10a into engagement with splicer/cutter 172 as shown by the dotted lines in FIG. 3A. Splicer/cutter 172 then cuts optical fiber 10a as shown in FIG. 3B and the remaining portion of optical fiber 10a to the right of the splicer/cutter 172 is removed. The ferrule 200 is moved by a clamp 180 from the ferrule feeder 174 into a receiving position adjacent to and aligned with splicer/cutter 172. The alignment collar 178 is then moved into position for receiving and guiding the cut optical fiber 10a into the ferrule 200. The clamp 176 is repositioned and clamped onto the optical fiber to the left of splicer/cutter 172. Splicer/cutter 172 releases the optical fiber loa thereby allowing the clamp 176 to move the cut end of optical fiber 10a through the alignment collar 173 and into a throughbore 204 of the ferule 200.

Figure 4:
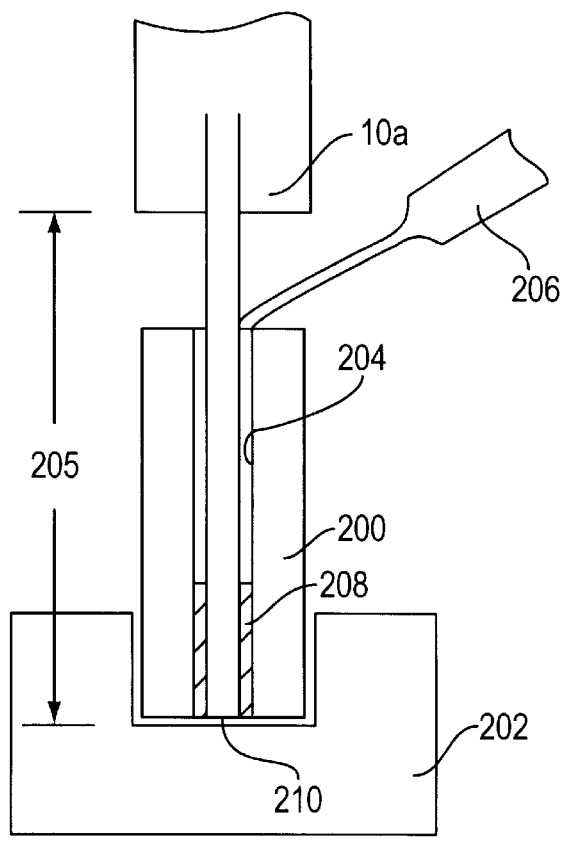
FIG. 4 is a diagram of an optical fiber in a mold.

A self centering mold 202 and an injector 206 are moved into position as shown in FIG. 4. It should be understood that although the invention as depicted in FIG. 4 shows the longitudinal axis of optical fiber 10a extending in a vertical direction, it should be understood that the method according to the present invention can be performed in other directions such as a horizontal orientation.

The ferrule 200 is made from stainless steel or ceramic. The self centering mold 202 is preferably formed of a material which does not adhere to molten metal is positioned around the ferrule 200 as shown in FIG. 4. The ferrule 200 is heated to approximately 900° C., a temperature corresponding to the melting point of pure aluminum. If other metals are used, the ferrule should be heated to the melting point of that metal. The ferrule is also heated so that it will expand making the optical fiber 10a easier to insert, and so the throughbore 204 of the ferrule 200 can accommodate the molten metal to be added as described below. The heating also prevents the added molten metal from prematurely solidifying.

After heating the ferrule, molten metal is provided between the exposed optical fiber and the cylindrical throughbore 204 while in an inert environment. The bore 204 is just slightly larger than the exposed region 205 of the optical fiber 10a. The molten metal is provided by adding (e.g., pouring) molten metal into the throughbore 204 and inserting the optical fiber into the throughbore 204, by dipping the exposed region 205 into molten metal and then inserting the dipped optical fiber into the throughbore 204, or by injecting molten aluminum between the throughbore 204 and the exposed region 205 using the injector 206.

The ferrule 200 and molten metal are then allowed to cool, during which the ferrule 200 will compress the molten metal, and wherein a chemical and/or compressive bond will form between the solidifying metal 208 and the exposed region 205. If pure aluminum is used, the pure aluminum will cool faster than the ferrule 200. Hence, the exposed region 205 will be centered within ferrule 200 as the pure aluminum cools and shrinks around the exposed region 205 of the optical fiber 10a within three microns or less forming a metal seal 208 with the exposed region 24 and the ferrule 200. The metal seal 208 may preferably extend the entire axial length of the ferrule 200, or as shown, may only extend for part of the axial length of the ferrule 200.

After hermetically sealing the optical fiber within the ferrule, the resulting structure provides a hermetically terminated optical fiber leaving an optical fiber end surface 210 extending beyond ferrule 200 or flush therewith which is not encapsulated by the molten metal.

The ferrule 200 has been illustrated having a cylindrical exterior surface. The exterior surface of the ferrule 200 serves as a structural interface to a connector, an adaptor and the like. Thus, the exterior surface may be any shape that mates with a corresponding adaptor or connector to interface with another terminated optical fiber. The exterior surface may also be coated with a soft deformable metal so that the exterior of the ferrule 200 can be hermetically sealed to a connector.

Figure 5:
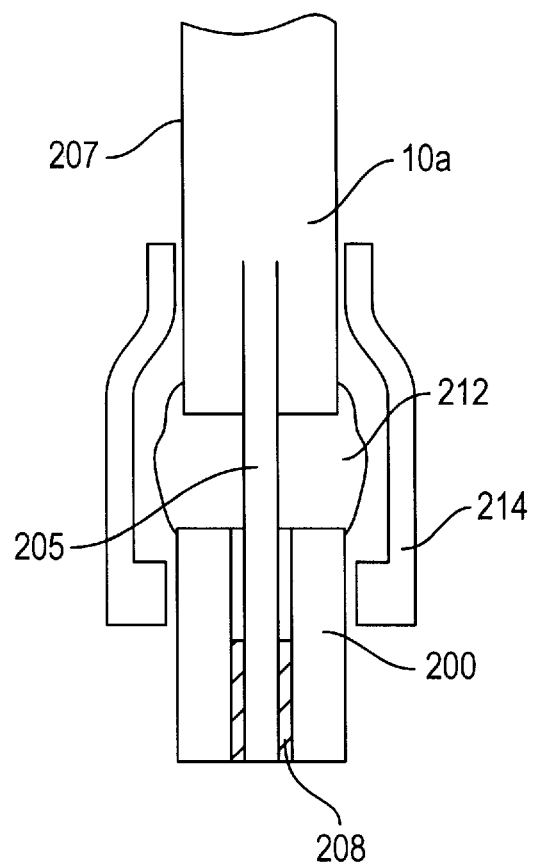
FIG. 5 is a diagram illustrating a ferrule hermetically sealed to the optical fiber.

As shown in FIG. 5, a sealant 212 is applied covering the exposed portion 205 between ferrule 200 and the covered region 207 of optical fiber 10a. The sealant 212 may be an RTV (room temperature vulcanizing) silicon coating, or a UV-cured acrylate. A strain-relief boot 214 is attached to the covered portion 207 and the ferrule 200 and shields the sealant 212 and exposed portion 205.

Although the invention has been described preferably using pure aluminum, other materials having a melting point below that of the ferrule may also be used. Preferably the metal layer forms a compressive shrink fit bond on the optical fiber because the metal has a higher coefficient of thermal expansion than does the optical fiber, although it is important that the metal is soft and ductile so as to not overstress the optical fiber. Other possible metals include gold and lead.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What I claim is:

1. A fiber optic connector, comprising:
   a ferrule having an outside diameter and a throughbore;
   an optical fiber having a portion positioned within said throughbore; and
   a metal comprising essentially of at least one of pure aluminum and cold, forming a hermetic seal between said ferrule and the portion of said optical fiber.

2. The fiber optic connector of claim 1, wherein said ferrule is formed of stainless steel.

3. The fiber optic connector of claim 1, wherein said ferrule is formed of ceramic.

4. The fiber optic connector of claim 1, wherein said metal centers the optical fiber within said ferrule.

5. The fiber optic connector of claim 1, wherein said optical fiber has an optical surface that is flush with an end of said ferrule.

6. The fiber optic connector of claim 1, wherein said metal forms a compressive seal on said optical fiber.

7. The fiber optic connector of claim 1, wherein said metal forms a chemical bond on said optical fiber.

8. The fiber optic connector of claim 1, wherein said metal forms a chemical and a compressive seal on said optical fiber.

9. The fiber optic connector of claim 1, wherein said optical fiber is concentric to said throughbore to within three microns or less.

10. The fiber optic connector of claim 1, wherein said optical fiber has an optical surface that is positioned outwardly from said ferrule.

11. A method of forming a fiber optic connector, comprising the steps of:
    heating a ferrule having a throughbore;
    placing an exposed region of an optical fiber within said throughbore;
    providing molten metal between said ferrule and said exposed region of the optical fiber at least partially within the throughbore; and
    forming a hermetic seal between said ferrule and said optical fiber at least one of subsequent to and during cooling of said molten metal.

12. The method of claim 11, wherein said providing step further comprises the step of providing the molten metal between the ferrule and the exposed region of the optical fiber at least partially within the throughbore, and the molten metal cooling faster that the ferrule, thereby facilitating the centering of the exposed region of the optical fiber within three microns or less with respect to the throughbore, as the molten metal cools and shrinks around the exposed region of the optical fiber forming a metal seal with the exposed region and the ferrule.

13. The method of claim 11, wherein said providing step further comprises the step of providing the molten metal comprising aluminum between the ferrule and the exposed region of the optical fiber at least partially within the throughbore, and the molten metal comprising the aluminum cooling faster that the ferrule, thereby facilitating the centering of the exposed region of the optical fiber as the molten metal cools and shrinks around the exposed region of the optical fiber forming a metal seal with the exposed region and the ferrule.

14. The method of claim 11, wherein said heating step further comprises the step of heating the ferrule, thereby facilitating the positioning of the molten metal between the ferrule and the exposed region of the optical fiber without the molten metal prematurely solidifying.

15. The method of claim 11, wherein said molten metal is pure aluminum.

16. The method of claim 11, wherein said ferrule is formed of stainless steel.

17. The method of claim 11, wherein said ferrule is ceramic.

18. The method of claim 11, wherein said hermetic seal provides a compressive bond between said metal and said optical fiber.

19. The method of claim 11, wherein said hermetic seal between said metal and said optical fiber is a chemical bond.

20. The method of claim 11, wherein said hermetic seal between said metal and said optical fiber is a chemical and compressive bond.

21. The method of claim 11, wherein said forming step includes aligning said optical fiber relative to said throughbore.

22. The method of claim 11, wherein said heating step comprises heating said ferrule to approximately 900° C.

23. The method of claim 11, wherein said providing step comprises one of injecting molten metal between said ferrule and said exposed region, dipping said optical fiber in said molten metal and inserting the dipped optical fiber into the ferrule, and pouring molten metal into said throughbore and then inserting the optical fiber therein.

24. The method of claim 11, wherein said placing step is performed with said optical fiber in a horizontal orientation.

25. The method of claim 11, wherein said placing step is performed with said optical fiber in a vertical orientation.

26. The method of claim 11, wherein said molten metal is gold.

27. The method of claim 11, wherein said molten metal is lead.

28. The method of claim 11, wherein said heating step further comprises the step of heating the ferrule, thereby expanding the ferrule and the throughbore associated therewith, facilitating the insertion of the optical fiber therein.

29. The method of claim 11, wherein said heating step further comprises the step of heating the ferrule, thereby facilitating the positioning of the molten metal between the ferrule and the exposed region of the optical fiber.

30. The method of claim 11, wherein said heating step further comprises the step of heating the ferrule, thereby facilitating the positioning of the molten metal between the ferrule and the exposed region of the optical fiber in an inert environment.

31. A method of securing an optical fiber to a ferrule for use in a fiber optic connector, comprising the steps of:

expanding a throughbore of a ferrule by applying energy to the ferrule producing an expanded throughbore;

providing a softened aluminum metal alloy at least in the expanded throughbore of the ferrule;

inserting an exposed region of an optical fiber within the expanded throughbore and at least on the softened aluminum metal alloy; and forming a seal between the ferrule and the exposed region of the optical fiber including the softened aluminum metal alloy substantially therebetween at least one of subsequent to and during cooling of the softened aluminum metal alloy in the expanded throughbore.

32. The method of claim 31, wherein said forming step further comprises the step of forming the seal between the ferrule and the optical fiber including the softened aluminum metal alloy substantially therebetween, whereby the softened aluminum metal alloy cools faster that the ferrule facilitating the formation of the seal.

33. The method of claim 31, wherein said forming step further comprises the step of forming the seal directly between the ferrule and the exposed region of the optical fiber, at least one of subsequent to and during the cooling of the softened aluminum metal alloy in the expanded throughbore.

34. A method of forming a fiber optic connector, comprising the steps of:

heating a ferrule having a throughbore;

providing molten metal in the throughbore of the ferrule;

inserting an exposed region of an optical fiber within the throughbore and the molten metal; and forming a hermetic seal between the ferrule and the optical fiber including the molten metal substantially therebetween, at least one of subsequent to and during cooling of the molten metal.

35. The method of claim 34, wherein said inserting step further comprises the step of inserting the exposed region of the optical fiber within the throughbore, by dipping the exposed region into additional molten metal and then inserting the dipped optical fiber into the throughbore, or by injecting the molten metal between the throughbore and the exposed region.

36. A method of forming a fiber optic connector, comprising the steps of:

heating a ferrule having a throughbore producing an expanded throughbore;

providing molten metal in the expanded throughbore of the heated ferrule;

inserting an exposed region of an optical fiber within the expanded throughbore and in the molten metal; and forming a seal between the ferrule and the optical fiber at least one of subsequent to and during cooling of the molten metal in the expanded throughbore.

37. The method of claim 36, wherein said heating step further comprises the step of heating the ferrule, thereby expanding the ferrule and the throughbore associated therewith, facilitating the insertion of the optical fiber therein.

38. The method of claim 36, wherein said heating step further comprises the step of heating the ferrule, thereby facilitating the positioning of the molten metal between the ferrule and the exposed region of the optical fiber.

39. The method of claim 36, wherein said heating step further comprises the step of heating the ferrule, thereby facilitating the positioning of the molten metal between the ferrule and the exposed region of the optical fiber in an inert environment.

40. The method of claim 36, wherein said heating step further comprises the step of heating the ferrule, thereby facilitating the positioning of the molten metal between the ferrule and the exposed region of the optical fiber without the molten metal prematurely solidifying.

41. The method of claim 36, wherein said providing step further comprises the step of providing the molten metal comprising aluminum between the ferrule and the exposed region of the optical fiber at least partially within the throughbore, and the molten metal comprising the aluminum cooling faster that the ferrule, thereby facilitating the centering of the exposed region of the optical fiber as the molten metal cools and shrinks around the exposed region of the optical fiber forming a metal seal with the exposed region and the ferrule.

42. The method of claim 36, wherein said providing step further comprises the step of providing the molten metal between the ferrule and the exposed region of the optical fiber at least partially within the throughbore, and the molten metal cooling faster that the ferrule, thereby facilitating the centering of the exposed region of the optical fiber within three microns or less with respect to the throughbore, as the molten metal cools and shrinks around the exposed region of the optical fiber forming a metal seal with the exposed region and the ferrule.

43. The method of claim 36, wherein said forming step further comprises the step of forming the seal directly between the ferrule and the exposed region of the optical fiber, at least one of subsequent to and during the cooling of the molten metal in the expanded throughbore.

44. A method of securing an optical fiber having a first diameter to a ferrule having a throughbore with a second diameter for use in a fiber optic connector, comprising the steps of:

heating the ferrule having the throughbore one of smaller than, equal to or slightly larger than the exposed region of the optical fiber, producing an expanded throughbore having a third diameter slightly larger than the second diameter and the first diameter of the optical fiber;

providing molten metal in the expanded throughbore of the heated ferrule, the expanded throughbore with the third diameter facilitating accommodation of the molten metal therein;

inserting an exposed region of an optical fiber within the expanded throughbore and in the molten metal, the expanded throughbore with the third diameter facilitating accommodation of the exposed region therein; and forming a seal between the ferrule and the optical fiber at least one of subsequent to and during cooling of the molten metal in the expanded throughbore.

45. The method of claim 44, wherein said providing step further comprises the step of providing the molten metal between the ferrule and the exposed region of the optical fiber at least partially within the expanded throughbore, and the molten metal cooling faster that the ferrule, thereby facilitating the centering of the exposed region of the optical fiber within three microns or less with respect to the throughbore, as the molten metal cools and shrinks around the exposed region of the optical fiber forming a metal seal with the exposed region and the ferrule.

46. The method of claim 44, wherein said forming step further comprises the step of forming the seal directly between the ferrule and the exposed region of the optical fiber, at least one of subsequent to and during the cooling of the molten metal in the expanded throughbore.

47. A method of securing an optical fiber to a ferrule for use in a fiber optic connector, comprising the steps of:

expanding a throughbore of a ferrule by applying energy to the ferrule producing an expanded throughbore;

providing substantially pure aluminum at least in the expanded throughbore of the ferrule;

inserting an exposed region of an optical fiber within the expanded throughbore and at least on the substantially pure aluminum; and forming a seal between the ferrule and the exposed region of the optical fiber including the substantially pure aluminum substantially therebetween at least one of subsequent to and during cooling of the substantially pure aluminum in the expanded throughbore.

48. The method of claim 47, wherein said forming step further comprises the step of forming the seal between the ferrule and the optical fiber including the substantially pure aluminum substantially therebetween, whereby the substantially pure aluminum cools faster that the ferrule facilitating the formation of the seal.

* * * * *